No. 692,366. Patented Feb. 4, 1902.
W. SCRIMGEOUR, Jr. & J. BUNTE.
MACHINE FOR WELDING LINKS.
(Application filed Apr. 1, 1901.)
(No Model.) 3 Sheets—Sheet 1.

FIG.I.

WITNESSES: INVENTORS

No. 692,366. Patented Feb. 4, 1902.
W. SCRIMGEOUR, Jr. & J. BUNTE.
MACHINE FOR WELDING LINKS.
(Application filed Apr. 1, 1901.)
(No Model.) 3 Sheets—Sheet 2.

WITNESSES:
Herbert Bradley
F. E. Guichen

INVENTORS
William Scrimgeour
John Bunte
by Darwin S. Wolcott Att'y.

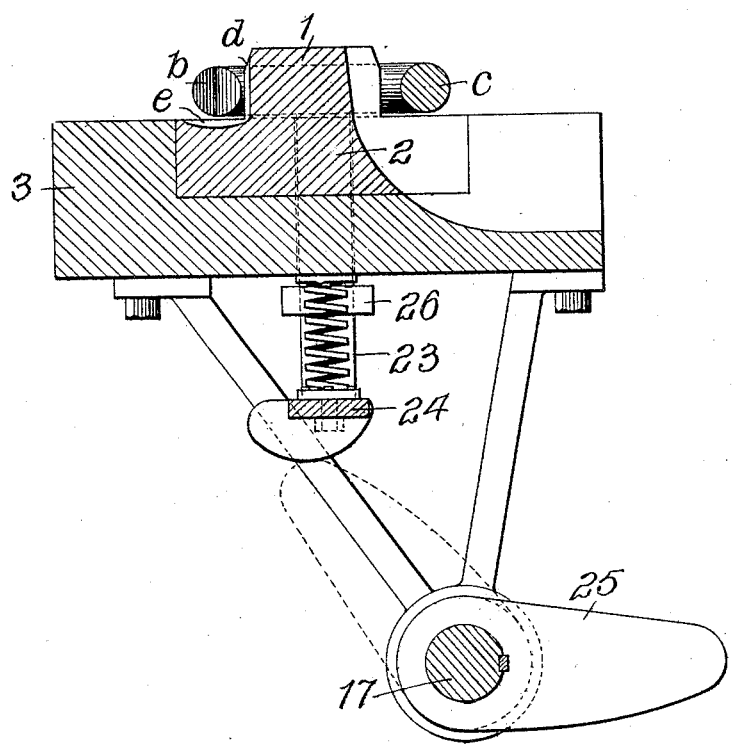

UNITED STATES PATENT OFFICE.

WILLIAM SCRIMGEOUR, JR., AND JOHN BUNTE, OF PORTSMOUTH, VIRGINIA, ASSIGNORS OF ONE-HALF TO ROBERT A. CARTER, OF PITTSBURG, PENNSYLVANIA.

MACHINE FOR WELDING LINKS.

SPECIFICATION forming part of Letters Patent No. 692,366, dated February 4, 1902.

Application filed April 1, 1901. Serial No. 53,809. (No model.)

*To all whom it may concern:*

Be it known that we, WILLIAM SCRIMGEOUR, Jr., and JOHN BUNTE, citizens of the United States, residing at Portsmouth, in the county of Norfolk and State of Virginia, have invented or discovered certain new and useful Improvements in Machines for Welding Links, of which improvements the following is a specification.

The invention described herein relates to certain improvements in mechanism for welding links, and has for its object a construction whereby pressure may be applied to the links to force the open ends thereof together progressively from points adjacent to the closed end of the link along the sides to the open end thereof, so that any displaced metal may be forced to the weld or the point of junction of the two ends.

The invention is hereinafter more fully described and claimed.

Figure 1:
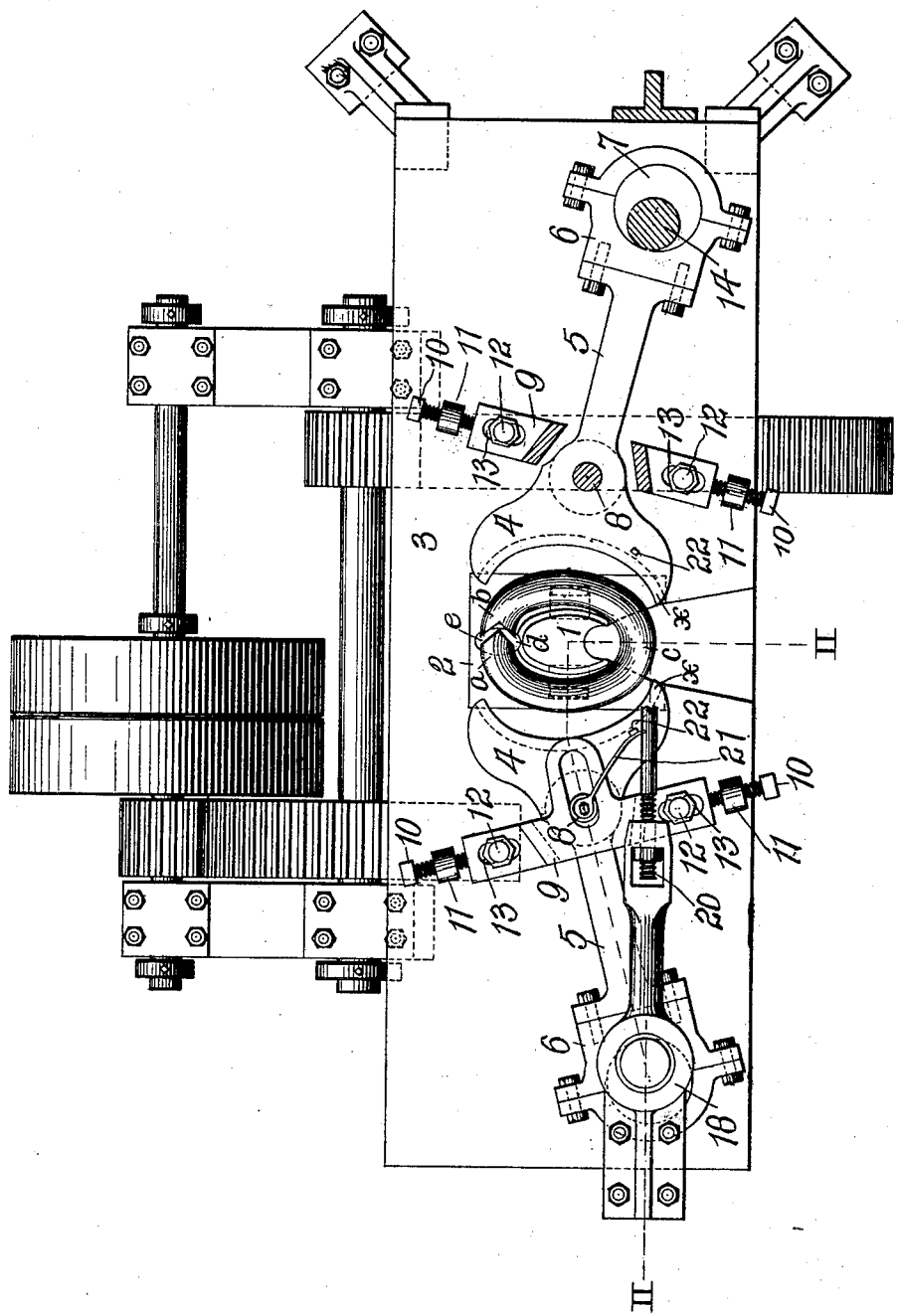
Figure 2:
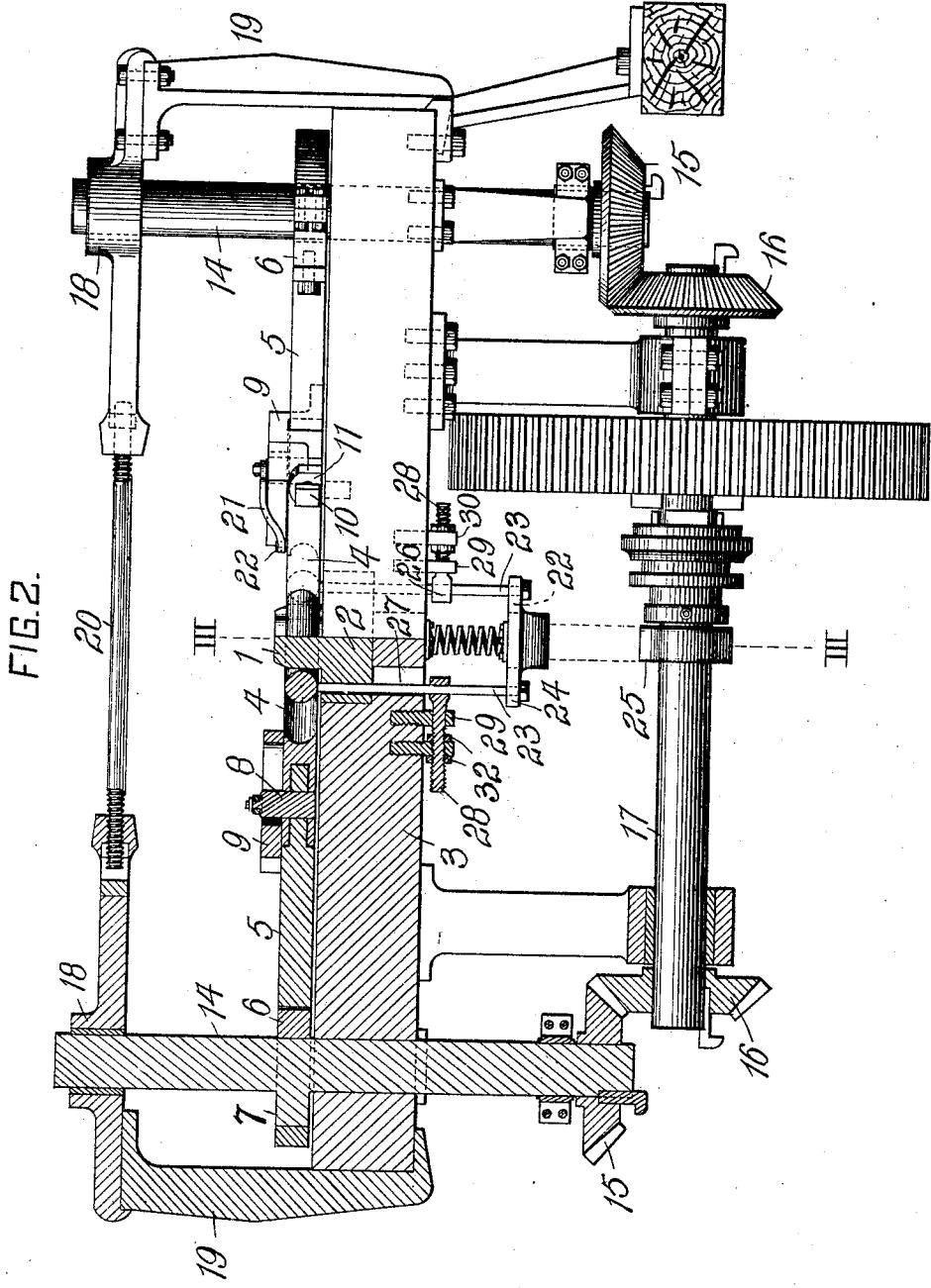

In the accompanying drawings, forming part of this specification, Figure 1 is a top plan view of our improved welding mechanism, a portion being shown in section. Fig. 2 is a view, partly in section and partly in elevation, of the mechanism, the plane section being indicated by the line II II, Fig. 1; and Fig. 3 is a vertical section on a plane indicated by the line III III, Fig. 2.

In the practice of our invention a former or guide-pin 1 when used is formed on or secured to a block 2, removably secured or held in a recess in the bed-plate 3 of the machine. As clearly shown in Fig. 1, this former is provided at one end with a recess for the reception of a previously-formed link. After the ends *a* and *b* of the link have been heated to a welding temperature the link is threaded through a previously-formed link and dropped over the former. The separated ends are then forced together by pressure applied progressively along the sides of the link from points adjacent to and on opposite sides of the closed end *c* of the link by means of pressure-jaws 4. These pressure-jaws have their inner faces of a shape or contour corresponding to the curvature of the sides of the link and are preferably provided with grooves, into which the sides of the link will project, as clearly shown in Figs. 1 and 2. The jaws are pivotally connected to arms 5, which have their opposite ends secured to the strap 6 of the eccentric 7 or to other means or mechanical devices whereby a backward-and-forward movement may be imparted to the arms 5 and the pressure-jaws 4. In order to insure a straight-line movement to the reciprocating arms 5, the pivot-pins 8, whereby the jaws are connected to the arms 5, extend up through slots formed in plates 9, adjustably secured to the bed-plate 3 of the machine. The adjustment of the plates 9 may be effected in any desired manner—such, for example, as that shown, consisting of set-screws 10, passing through lugs 11 on the bed-plate and bearing at their inner ends against the ends of plate 9. These plates are held in position by means of bolts 12 passing through slots 13 in the plates.

The eccentrics 7 are mounted upon vertical shafts 14, extending down through suitable bearings in the bed-plate and provided at their lower ends with bevel-pinions 15, which intermesh with corresponding pinions 16 on the power-shaft 17 of the machine. The upper ends of the shafts are mounted in bearings 18, formed on or secured to the upper ends of brackets 19, secured to the bed-plate of the machine, and these brackets are connected across the machine by means of bolts 20, whereby the shaft may be held in line without liability of bending.

The jaws 4 are normally held by means of springs 21, which have one end secured to the pivot-pins 8, while the opposite ends bear against pins 22 on the jaws, so that the points *x* of the jaws will strike first against the link on opposite sides of the point *c* on the inward movement of the jaws. As the jaws continue to move inward they will bear progressively on the sides of the links from the first points of contact up along the sides and around on the open ends, forcing the latter in toward each other and effecting the weld.

It is desirable in making welds that no portion of the parts to be united should be chilled until the weld is effected, and in order to avoid such chilling action the end of the former 1 at which the weld is made and a portion of the supporting-block 2 are recessed, as shown at d and e, so that the highly-heated ends of the link will not come into contact with any chilling surfaces.

It is characteristic of the operation of our mechanism that the link is not subjected to any stretching or enlargement, so that when the link is completed and the weld formed the link will tightly embrace the former, and such grip on the former will be increased by the contraction of the link in cooling. In order to remove the link from the former under such conditions, we have provided lifting-fingers 23, which have their lower ends secured to a head-block 24, which is adapted to be raised by a cam 25, so secured to the shaft 17 as to raise the head 24 and fingers 23 as the jaws 4 move back from the completed link. The pins 23 pass through guide-blocks 26 and through slots 27 in the bed-plate and suitable openings in the block 2 and are adapted to bear when raised against the under side of the link and force the same off of the former. The lower ends of the pins are secured in slots in the head 22, and the guide-blocks 26 are formed on or connected to threaded stems 28, which pass through eyes 29 and 30, secured to the bed-plate of the machine. These stems 28 are threaded, and the guide-blocks are adjusted by means of nuts 32, bearing on opposite sides of one of the eyes, as clearly shown in Fig. 2.

By adjusting the plates 9 on the bed-plate the points of contact of the jaws on the link can be shifted or the angle at which the jaws will operate on the links can be changed, as required. It will be understood that different formers and jaws will be employed for different sizes of links to be welded.

It is generally customary in welding links to heat only the ends to be welded, the other portions remaining cold, except for such heat as may pass to them by conduction along the metal of the link, so that when the separated ends of the link are welded together the metal of the closed end thereof will be in tension and tend to pull apart the connected ends. In order to avoid this, we prefer to heat not only the ends to be welded, but also the closed portion of the link; but the latter should not be heated beyond a low red heat or sufficient to permit the flexure of such closed end by the operation of the jaws without placing the metal in tension.

It is preferred that the ends of the link should be shaped, as shown, to form a V-weld, although the ends may be square to form a butt-weld.

We claim herein as our invention—

1. In a machine for welding links, the combination of pressing-jaws and mechanism for causing the jaws to bear progressively from one end to the other on the sides of the link, substantially as set forth.

2. In a machine for welding links, the combination of a former, pressing-jaws and means for causing the jaws to bear progressively from one end to the other on the sides of the link, substantially as set forth.

3. In a machine for welding links, the combination of a former, movable arms, pressing-jaws pivotally connected to the arms, and means for causing successive portions of the jaws to bear against the sides of the link, substantially as set forth.

4. In a machine for welding links, the combination of a former, adjustable guides, arms movable through the guides, jaws pivotally connected to the arms, and means for reciprocating the arms, substantially as set forth.

5. In a machine for welding links, the combination of a former, pressing-jaws, springs for holding the jaws normally at an angle to the major axis of the former, and means for reciprocating the jaws, substantially as set forth.

6. In a machine for welding links, the combination of a former recessed adjacent to the point at which the weld is formed, pressing-jaws, and means for reciprocating the jaws, substantially as set forth.

In testimony whereof we have hereunto set our hands.

WILLIAM SCRIMGEOUR, JR.
JOHN BUNTE.

Witnesses:
R. L. WILLIAMS,
A. I. BAILEY.